June 28, 1955  F. M. JOHNSON  2,712,060
COMBINED DIRIGIBLE SPOT AND FLOOD LIGHT FOR AIRCRAFT
Filed May 14, 1953  2 Sheets-Sheet 1

INVENTOR.
FRANCIS M. JOHNSON
BY
ATTORNEYS

June 28, 1955   F. M. JOHNSON   2,712,060
COMBINED DIRIGIBLE SPOT AND FLOOD LIGHT FOR AIRCRAFT
Filed May 14, 1953   2 Sheets-Sheet 2
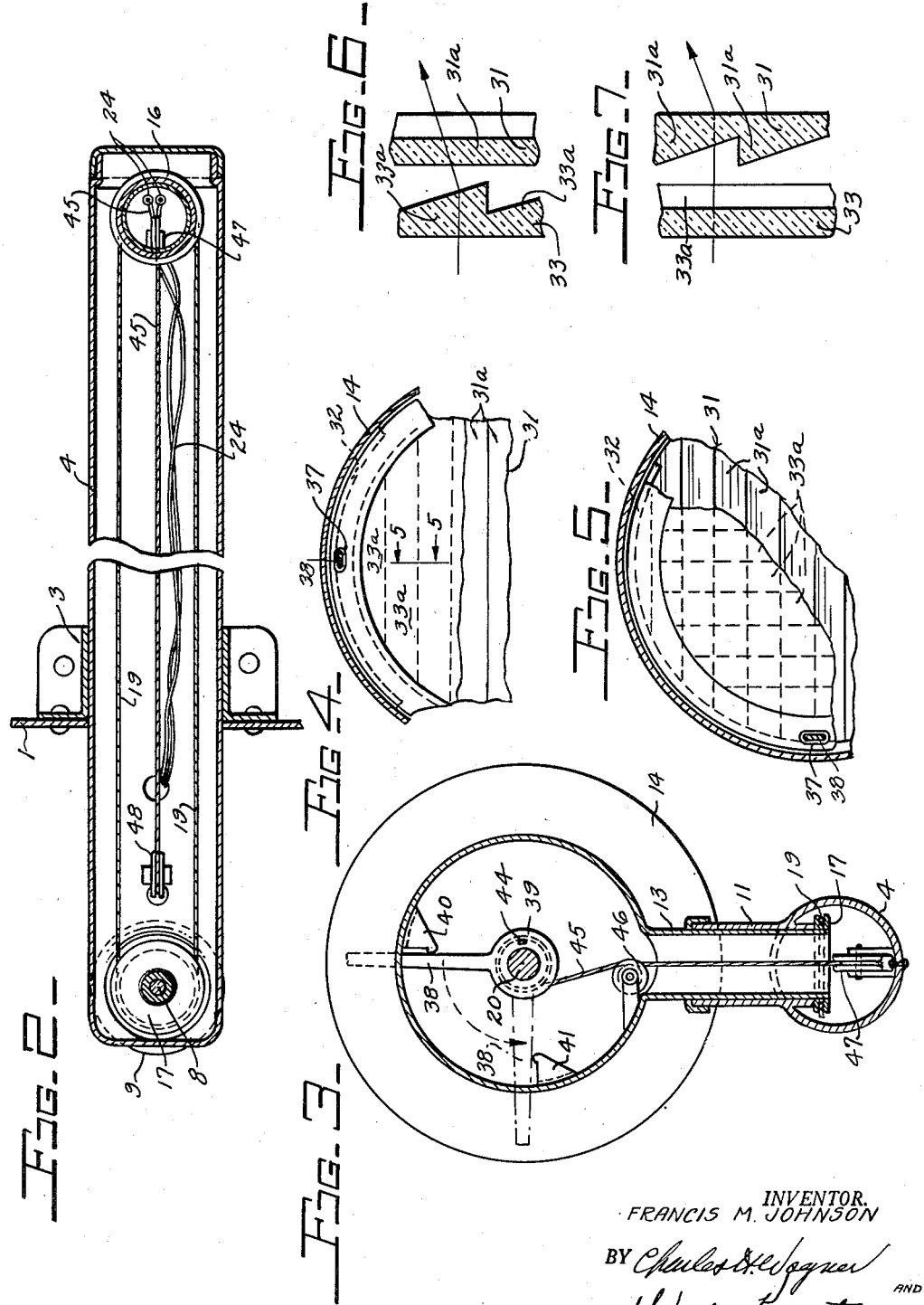
INVENTOR.
FRANCIS M. JOHNSON
BY
ATTORNEYS United States Patent Office 2,712,060
Patented June 28, 1955

2,712,060

COMBINED DIRIGIBLE SPOT AND FLOOD LIGHT FOR AIRCRAFT

Francis M. Johnson, Dayton, Ohio, assignor to the United States of America as represented by the Secretary of the Air Force Application May 14, 1953, Serial No. 355,200

6 Claims. (Cl. 240—61.13)

(Granted under Title 35, U. S. Code (1952), sec. 266)

The invention described herein may be manufactured and used by or for the Government for governmental purposes without payment to me of any royalty thereon.

This invention relates to dirigible search lights of the so called spot light types, and more particularly to improved means for selectively and quickly changing the light beam to selectively effect a concentrated projected narrow beam or a wide or flood light beam as desired.

The novel combination of the combined spot and flood light structure is particularly applicable in search and rescue procedure, both on land and sea, and is primarily useful on aircraft, seacraft, helicopters and other vessels equipped for rescue operations.

An object of the invention is the provision of means whereby the light is mounted for extension from, or retraction toward the outer surface or fuselage of an aircraft, as well as for easy manipulation from within the aircraft to selectively provide a spot or flood light which is dirigible or directable universally in substantially any direction.

A further object is the provision of rotary lens means within the main light housing, whereby the lens is easily and positively operable manually at a remote point for quickly effecting a change between a spot or flood light beam while the axis of the beam points or extends in substantially any desired direction.

A further object is the provision of a pair of Fresnel type lenses disposed in front of the spot light beam with the ribs or prisms extending across the lenses in parallel relation, one of the lens elements being rotatable on the axis of the light beam relative to the other lens and arranged to substantially counteract the beam refractions of each other when in "spot light" position to cause a spot or search light beam to be projected, and upon rotation of one of the lens members substantially 90° to the other about said beam axis to cause the spot light beam to be refracted in one plane by one of the lens members and in a substantially 90° relative plane by the other lens member to produce a wide or "flood light" beam.

A further object is the provision of a cable operating means for rotatably adjusting the rotary lens element in one direction and spring means for rotating the lens in the opposite direction, keeping the cable under tension and automatically returning the lens to its initial position.

A further object is an arrangement whereby the lens elements are easily arranged for assembly and replacement, with the Fresnel elements in parallel relation across the beam and facing each other in closely spaced complemental relation for spot light projection, and includes a cable operating lever member pivoted on an axis through the centers of the lens elements normal thereto, the lever having its outer end disposed to rotate one of the lens elements through an arc of 90° incident to a 90° swing of the lever in one direction by the cable means, and spring means for tensioning the lever to return the lever and cable means and lens in the opposite direction.

Other objects and advantages of the invention will become apparent from the following description and accompanying drawing in which like reference characters refer to like parts in the several figures.

Drawings

Fig. 2 is a longitudinal sectional view taken in a plane at 90° to Fig. 1, substantially on line 2—2, looking in the direction of the arrows.

Fig. 3 is a vertical sectional view taken approximately in the plane indicated by line 3—3 in Fig. 1, looking in the direction of the arrows.

Fig. 4 is a fragmentary sectional view taken about on line 4—4 of Fig. 1, looking toward the rotatably adjustable Fresnel lens element, showing both lens elements with their Fresnel or prism portions parallel, for effecting a spot light or narrow beam.

Fig. 5 is a view similar to Fig. 4, but illustrating the rotary lens element shifted 90° to effect a wide or flood light beam.

Figs. 6 and 7 are views taken through the rotary and stationary Fresnel lens elements illustrated in Fig. 5, but in planes at 90° to each other, Fig. 6 illustrating how the light beam is refracted in one plane by the first or rotary lens element, and Fig. 7 showing how the beam is refracted in the 90° plane by the other or stationary lens element.

Figure 1:
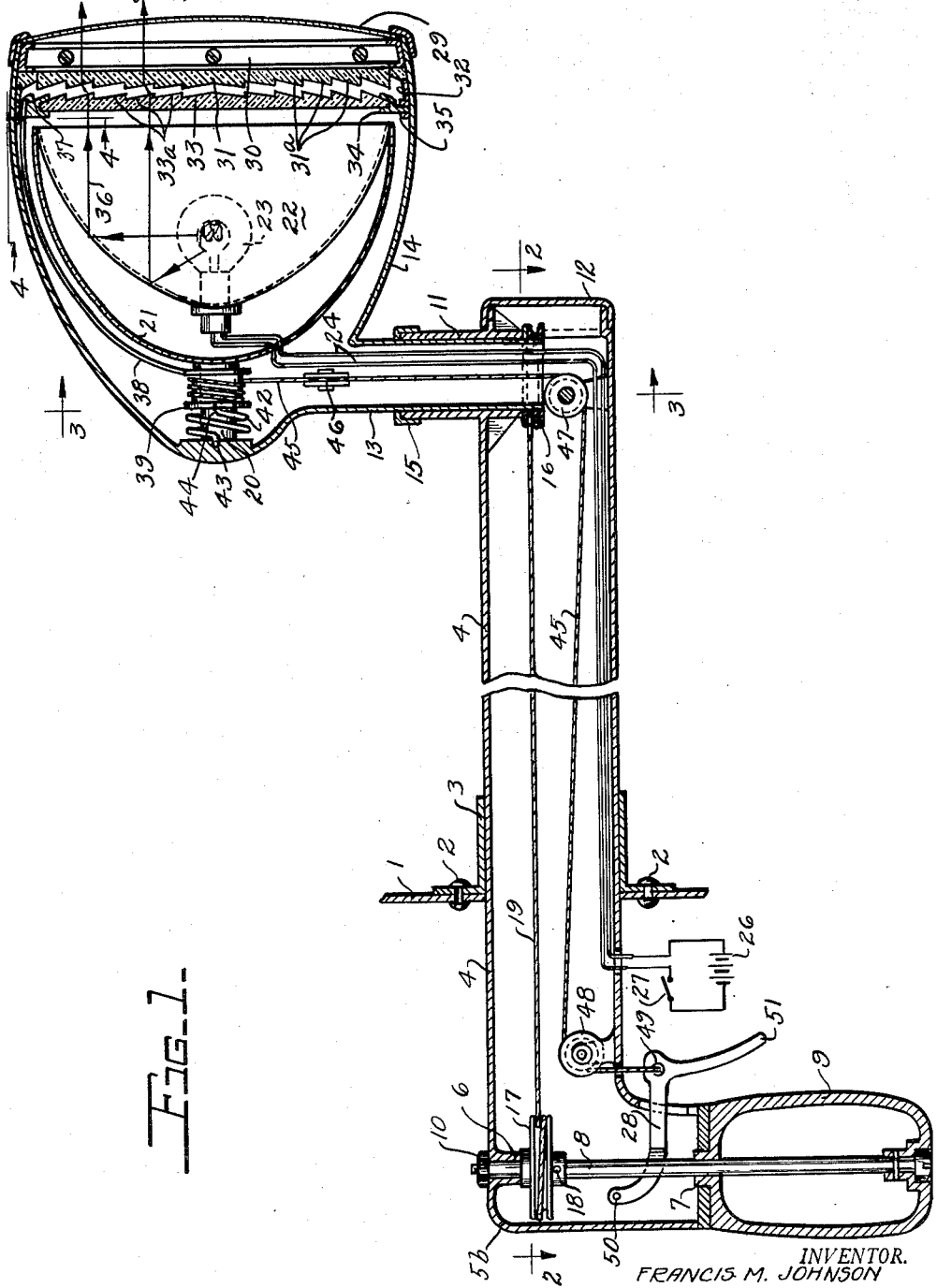
Fig. 1 is a vertical longitudinal sectional view through my improved spot and flood light structure, illustrating the mounting thereof for extension and retraction, the main support or mounting tube being broken away and shown foreshortened for convenience.

Referring to Fig. 1 of the drawings the reference numeral 1 denotes a supporting panel which may be part of the fuselage structure of an aircraft. Suitably secured thereto by bolts or rivets 2 is a flanged tubular guide member 3 in which my improved spot and flood light structure is mounted. The spot light includes a tubular support 4, slidably and rotatably adjustable in the tubular guide member 3, the inner end 5 extending downwardly and provided with suitable bearings 6 and 7 in which is mounted a shaft 8 and attached handle member 9. The handle 9 is pinned on the shaft 8 and retained rotatably in the guide bearing 6 by a nut 10.

A tubular guide bearing 11 is fixed in the outer end 12 of the main tubular support 4 and rotatably mounts the supporting stem 13 for the main or outer lamp housing or case 14, the case being somewhat conventional in shape as shown in Fig. 1. A flanged collar 15 is fixed on the stem 13 and limits axial movement of the stem 13 in one direction, while a cable drum 16 fixed on the other or inner end of the stem 13 limits axial movement thereof in the opposite direction, permitting the stem to rotate on its axis.

The shaft 8 has a cable drum 17 fixed thereon by a pin 18, the axes of the shaft 8 and stem 13 being parallel and both drums 16 and 17 are located substantially in a plane passing approximately through the central portion of the tubular support 4 as shown.

A cable element 19, in effect an endless cable as shown in Fig. 2, is wrapped around both of the drums 16 and 17 several times, preferably being secured to the two drums and constitutes the means for rotating the stem 13 and lamp housing 14 carried thereon in one plane from the handle 9 for directing the axis of the light beam through at least 360° in one plane.

Lateral swing movement of the handle 9 rotates the tubular member 4 on its axis in the bearing 3 for tilting the lamp housing 14 to direct the light beam axis through about 360° in a second plane normal to the aforementioned plane.

When the handle 9 is grasped by the operator and tilted this tilts the stem 13. Rotation of the handle 9 rotates the shaft 8, adjusting the rotative position of the drum 17. This adjusts the cable means 19 and correspondingly adjusts the drum 16 to swing the axis of the beam from the lamp housing in a plane perpendicular to the axis of the stem 13.

The main or outer lamp housing 14 tapers or curves rearwardly in a conventional manner and carries a forwardly extending central stub axle or shaft 20 on the front end of which is carried a reflector housing 21 curving outwardly and forwardly with a parabolic reflector 22 fixed thereon at its periphery. Mounted within the reflector 22 in the usual manner is a head light or search light bulb 23 with flexible leads 24 extending therefrom through an opening 25 in the shell 21 and the interior of the shell 14, stem 13 and main tubular support and adapted to supply current to the bulb 23 from a power source 26 under control of a switch 27 placed convenient to the handle 9 and a trigger member 28, the latter to be described.

A convex cover glass 29 closes the case against the weather. Directly behind the cover glass is a retainer ring 30, retaining the stationary Fresnel glass or plate 31 in position against a second retainer ring 32 holding the plate in fixed position with the Fresnel ribs or ribs 31a preferably disposed as shown in Figs. 1 and 5, the ribs 31a are parallel to each other, inclining rearwardly and outwardly at greater angles from the central diameter toward the outer edge of the plate.

Mounted directly behind the Fresnel plate 31 in close proximity thereto is an angularly adjustable Fresnel plate 33, this plate 33 having preferably an outer annular metal carrier plate or ring 34 disposed to be freely rotatable between the spacer ring 32 and an annular stop flange fixed on the inner side of the shell 14.

The plate 33 is also a Fresnel type of lens having complementary prism elements 33a facing the elements 31a substantially as shown in Fig. 1 and is fixed in the carrier plate or mounting ring 34 to rotate therewith between the position in Figs. 1 and 4 where the ribs 31a and 33a are parallel and in a position as shown in Fig. 5 where the ribs 31a and 33a are at right angles to each other. In the first position the light rays from the reflector 22, as indicated at 36 are initially parallel, being refracted outwardly by the first set of ribs 33a and then refracted back to their initial directions by the second or complemental ribs 31a.

The rotary mounting plate 34 is formed with an opening 37 therethrough to receive the outer end of an actuating lever 38 projecting from the periphery of a cable drum 39 which is journalled on the stub shaft 20 which supports the reflector case 21, the stop members 40 and 41 limit the travel of the actuating arm to 90°.

A coil spring 42 surrounds the stub axle shaft 20 with one end fixed to the outer shell 14 at 43 and the other end anchored in an opening in the hub or cable drum 39 at 44, being tensioned to yieldably retain the arm 38 against the stop 40.

A flexible actuating connector or cable 45 is wrapped several times around the drum 39 with its end secured to the drum 39 and extends over pulleys 46 and 47 to centralize the cable on the axis of the stem 13, the cable 45 then extending rearwardly through the tubular support and over the pulley 48 with its end connected to the actuating lever 28 at 49.

The lever or trigger 28 is pivoted at 50 with its operating end 51 disposed conveniently in front of the handle member 9 where it can be pulled by the operator's index finger. Pulling the cable 45 swings the arm 38 which rotates the Fresnel plate 33 through an arc of 90° to dispose the ribs 31a and 33a at right angles to each other as seen in Figs. 5, 6 and 7, the position being determined by the limit stop 41 as shown in phantom lines in Fig. 3.

It is preferable to provide the stem 13 with a stop or stops to limit rotation of the stem to about 360° although, if slip rings are used for the conductors 24 between the stem 13 and tubular support 4 and a swivel is interposed in the cable member 45 between pulleys 46 and 47 rotation of the stem may be greater than 360°.

In the operation a direct inward pull on the handle retracts the tubular support to bring the lamp housing 14 close to the side panel 1, reducing the exposed area of the supporting structure to the air stream when mounted on aircraft, and reducing the liability of damage to the lamp structure. The lamp diameter is preferably about 9" and the length of the tubular support should be such that about a 4 or 6 foot distance is afforded between its retracted and extended positions, also it is preferable that the outer end portion of the tubular support be angled or inclined and the stem member shorter so as to bring the center of the lamp housing 14 closer to the central axis of the inner portion of the tubular support 4 and lower the height of the lamp housing above the aforesaid axis. This produces a searchlight structure that is more nearly balanced against the pressure of the air stream and can be more easily adjusted while the aircraft is moving at reasonably high speeds.

When the handle 9 is pushed outwardly the tubular support 4 slides in the guide bearing 3 to position the lamp head in a better position for covering a greater area of search.

Rotation of the handle swings the beam through any angle in one plane while swinging the handle laterally tilts the stem 13 to swing the beam through any angle in the second plane perpendicular to the first plane, permitting the beam to be directed in any direction.

The spring 42 normally retains the lens elements 31 and 33 in spot or search light position as seen in Fig. 1 at all times. But when the operator wishes to broaden the beam at any time, he can easily and quickly pull the trigger 51, tensioning the cable 45 to rotate the lever 38, which shifts the rear lens element 33 to dispose the ribs cross ways as shown in Fig. 5, providing a spreading or flood light beam. The spring 42 returns the lens to Fig. 1 position immediately upon release of the trigger by the operator's finger.

While one particular embodiment of the invention has been described, it is understood that the invention is not to be restricted thereto, and all modifications are intended to be covered which would be apparent to one skilled in the art and which would come within the scope of the appended claims.

I claim:

1. In a universally directable combined spot and flood light structure, a support, a parabolic reflector mounted on the support for universal tilting movements to selectively dispose the axis of the reflector in any direction, a pair of complemental transparent plates mounted in closely spaced parallel relation to each other across the front of the reflector perpendicular to the axis thereof, means mounting one of said plates rotatably on said reflector axis relative to the other plate through an arc of substantially 90°, each of said transparent plates having prism ribs thereon disposed in parallel relation to each other inclining in opposite directions from a plane through the center of the plate perpendicular to the plate with the parallel ribs on one plate facing the parallel ribs on the other plate, complementary thereto at equal distances from the centers of the disks, whereby when the plates are disposed in one position the complementary ribs of one plate are positioned in the reflected light in front of the other in parallel relation, counteracting the refraction of the beam passing therethrough from the reflector, and 90° rotative adjustment positions the parallel ribs on one plate perpendicular to the parallel complemental ribs on the other plate, whereby the light beam from the reflector in passing through the ribs of one of the plates is spread thereby in one plane, and the light beam in passing through the transversely disposed ribs of the other plate is spread thereby in a transverse plane to produce a flood light beam.

2. In a combined spot and flood light structure, a fixed support, a tubular support mounted therein for rotative and axial sliding adjustments, a rotary handle journalled on one end portion of the tubular support, and extending laterally of the longitudinal axis of the tubular support, a rotatable lamp supporting stem having an inner end projecting into the other end of the tubular support with its rotative axis disposed substantially perpendicular to the longitudinal axis of the tubular support, a lamp housing fixed on other end of said stem, a parabolic reflector fixed therein with its axis substantially perpendicular to the axis of the stem, a pair of cable drum members located within the tubular support at opposite ends thereof rigidly connected respectively to said handle members and said stem, flexible cable actuating means connected between said drums for rotatable adjustment of the stem from the handle member, an actuating trigger member carried by the inner end of the tubular support adjacent the handle member for simultaneous manipulation with the handle member by an operator, a pair of parallel complemental parallel transparent plates mounted parallel within the lamp housing in front of said reflector, perpendicular to the axis of said reflector, one of said plates being fixedly mounted in the housing, means for mounting the other plate rotatably within said housing, said plates each having a plurality of parallel complementary prism rib members thereon facing each other and inclining in opposite directions from a plane through center of the plate perpendicular thereto, said rotatable plate being adjustable between a position disposing the ribs thereon in parallel complemental refracting relation to the ribs on the other plate, and a substantially 90° rotated position disposing the ribs thereon perpendicular to the ribs on the other plate, whereby the beam from the reflector passing through the ribs of the plate nearest the reflector is first refracted thereby to spread the beam in one plane, and the ribs of the second plate contract the beam in said same plane substantially to its initially reflected direction, when the complemental ribs of both plates are parallel in the reflected beam, and upon rotative adjustment of the shiftable plate to dispose the ribs on the plates in transverse relation, the beam is refracted and spread in one plane by the ribs on one of the plates, and refracted and spread in a transverse plane by the ribs of the other plate, to produce a spread or flood light beam, cable means extending through said tubular member, and substantially centrally through the stem member, one end thereof being connected to the trigger for actuation thereby, and its opposite end operatively connected to the rotatable plate, for rotative adjustment thereof by said trigger member.

3. Apparatus as claimed in claim 2 in which the connection between the cable means and the rotatably adjustable transparent plate includes a cable drum disposed axially in the lamp housing behind the reflector to which the end of the cable is connected, a lever fixed to and extending from said last cable drum having a free end in actuating engagement with the rotatable Fresnel plate, spring means connected between the lamp housing and the lever for tensioning the last mentioned cable means to lever and return the adjustable plate, cable and trigger to their initial position upon release of the trigger by the operator.

4. Apparatus as claimed in claim 3 in which the lamp housing is formed with a stub shaft projecting forward on the reflector axis with its axis intersecting the axis of the stem member, the last mentioned cable drum being journalled for relative rotation on said shaft with the lever projecting therefrom with its outer end in actuating engagement with the rotatably adjustable plate, and the spring means comprises a coil spring having one end connected to the lamp housing and its other end connected to the last mentioned cable drum.

5. Apparatus as claimed in claim 2 in which both of the plates are substantially the same diameter, with similar located parallel prismatic ribs thereon facing each other in closely spaced relation, said parallel ribs having corresponding substantially equal widths, heights and prismatic wedge portions of equal inclinations from respective surfaces of the plates opposite their ribs, said ribs extending across the plates parallel to each other and to a medium plane between its opposite edges passing through the central axis of the plates, whereby the prismatic ribs are shiftable by relative movement of the plates to one position in front of each other in the path of the beam from the reflector, and shiftable by relative predetermined angular movement of the plates into transverse relation, for spreading the beam from said reflector in transverse intersecting planes, to form a flood light beam.

6. A combined spot and floodlight structure, comprising a support, an outer reflector housing dirigibly mounted thereon having an open front end and a central light axis, a first transparent ribbed prism plate fixed across the front end of the housing, said first plate having a plurality of prism ribs thereon facing inwardly in parallel relation from the rear face of the plate, a second transparent ribbed prism plate having prism ribs thereon complemental to those on the first plate, disposed in parallel relation and projecting toward the ribs on the fixed plate, annular mounting means between the periphery of the second prism plate and the mouth of the housing, rearwardly of the first prism plate, for rotatably mounting the second plate in said housing, a cylindrical stem extending forwardly from the center of the rear of the housing, toward the centers of the plates, a parabolic reflector fixed on the forward end of said stem rearwardly of said second plate, with its axis coincidental to the central light axis, in spaced relation to said housing, a cable drum rotatable on said stem, an actuating arm fixed on said cable drum and extending between the interior of the housing and the exterior side of the parabolic reflector with its outer end in actuating engagement with said annular mounting means, stop means on the housing limiting rotative movement of the second plate between two positions to 90°, with the prism ribs of the second plate parallel to the prism ribs of the first plate, in one position, and the prism ribs of the second plate normal to the prism ribs of the first plate when in the other position, spring means between the cable drum and the housing urging said arm in one direction toward said stop means, and cable actuating means wrapped around said cable drum for rotating the arm in the opposite direction toward the other stop means.

References Cited in the file of this patent

UNITED STATES PATENTS

| | | |
|---|---|---|
| 1,768,613 | Kosian | July 1, 1930 |
| 1,875,607 | Hummert | Sept. 6, 1932 |
| 2,155,752 | Brand | Apr. 25, 1939 |

FOREIGN PATENTS

| | | |
|---|---|---|
| 431,096 | Italy | Feb. 23, 1948 |